(12) United States Patent
Chen et al.

(10) Patent No.: US 11,121,621 B1
(45) Date of Patent: Sep. 14, 2021

(54) LOW-POWER-CONSUMPTION PROTECTION CIRCUIT

(71) Applicant: Chicony Power Technology Co., Ltd., New Taipei (TW)

(72) Inventors: Fu-Sung Chen, New Taipei (TW); Chi-Chun Chen, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/860,537

(22) Filed: Apr. 28, 2020

(30) Foreign Application Priority Data

Mar. 13, 2020 (TW) .................................. 109108499

(51) Int. Cl.
 *H02M 1/32* (2007.01)
 *H02M 3/335* (2006.01)
 *H02H 7/12* (2006.01)
 *H02M 1/00* (2006.01)

(52) U.S. Cl.
 CPC ............ *H02M 1/32* (2013.01); *H02H 7/1213* (2013.01); *H02M 3/33523* (2013.01); *H02M 1/0009* (2021.05); *H02M 1/0025* (2021.05); *H02M 1/0032* (2021.05); *H02M 1/325* (2021.05)

(58) Field of Classification Search
 CPC ...... H02M 1/32; H02M 1/325; H02M 1/0009; H02M 1/0032; H02H 7/1213
 See application file for complete search history.

(56) References Cited

U.S. PATENT DOCUMENTS

| 6,191,565 | B1 | 2/2001 | Lee et al. | |
| 6,373,735 | B2 | 4/2002 | Usui | |
| 7,233,114 | B2 | 6/2007 | Lee | |
| 7,782,002 | B2 * | 8/2010 | Cook, II | H02M 3/28 |
| | | | | 318/471 |
| 8,044,606 | B2 | 10/2011 | Chang et al. | |
| 2007/0145956 | A1 | 6/2007 | Takeuchi | |
| 2013/0294116 | A1 * | 11/2013 | Pan | H02M 1/32 |
| | | | | 363/21.09 |
| 2018/0309287 | A1 * | 10/2018 | Peng | H02H 1/0007 |
| 2020/0076300 | A1 * | 3/2020 | Chiu | H02M 3/156 |
| 2020/0403507 | A1 * | 12/2020 | Chan | H02M 3/156 |

FOREIGN PATENT DOCUMENTS

| CN | 101662213 | A | 3/2010 |
| CN | 102332827 | A | 1/2012 |
| CN | 203205843 | U | 9/2013 |
| CN | 106329933 | A | 1/2017 |
| CN | 110022050 | A | 7/2019 |

(Continued)

*Primary Examiner* — Alex Torres-Rivera
(74) *Attorney, Agent, or Firm* — Innovation Capital Law Group; Vic Lin

(57) ABSTRACT

A low-power-consumption protection circuit includes a load detection module, a secondary feedback control module, and a primary control module. The load detection module is coupled to a current detection unit. The secondary feedback control module is coupled to the load detection module and an isolation unit. The primary control module is coupled to the isolation unit and an isolation switch. When the load detection module detects that the current detection unit outputs a voltage level, the secondary feedback control module transmits a protection signal to the primary control module through the isolation unit.

3 Claims, 4 Drawing Sheets

(56) References Cited

FOREIGN PATENT DOCUMENTS

| | | | |
|---|---|---|---|
| TW | 201537877 | A | 10/2015 |
| TW | I517511 | B | 1/2016 |
| TW | 201703413 | A | 1/2017 |
| TW | 201824677 | A | 7/2018 |
| TW | 201840084 | A | 11/2018 |
| TW | 201933739 | A | 8/2019 |

* cited by examiner

LOW-POWER-CONSUMPTION PROTECTION CIRCUIT

CROSS-REFERENCE TO RELATED APPLICATION

This non-provisional application claims priority under 35 U.S.C. § 119(a) to Patent Application No. 109108499 filed in Taiwan, R.O.C. on Mar. 13, 2020, the entire contents of which are hereby incorporated by reference.

BACKGROUND

Technical Field

The present invention relates to a protection circuit, in particular to a low-power-consumption protection circuit.

Related Art

In recently, electronic products explosively develop, and electronic products require a wide variety of input voltages. In order to meet different voltages required for operation of various electronic products, power delivery (PD) devices capable of supporting multiple groups of output voltages are developed. Moreover, the PD devices need to conform to limited power source (LPS) specifications at different output voltage levels.

However, when a LPS test is carried out before a product is delivered or repaired, an overcurrent protection element at an output end of the PD device needs to be short-circuited so as to check whether the PD device conforms to the LPS specification or not. In this case, an overcurrent protection mechanism is turned off. Thus, the PD device may not be timely protected when the PD device is abnormal. For example, the PD device is abnormal when other elements of the PD device are short-circuited or open-circuited.

SUMMARY

Based on the above, the present invention provides a low-power-consumption protection circuit. The present invention may provide circuit protection in real time when a LPS test is carried out.

According to some embodiments, the low-power-consumption protection circuit includes a load detection module, a secondary feedback control module, and a primary control module. The load detection module is coupled to a current detection unit. The secondary feedback control module is coupled to the load detection module and an isolation unit. The primary control module is coupled to the isolation unit and an isolation switch. When the load detection module detects that the current detection unit outputs a voltage level, the secondary feedback control module transmits a protection signal to the primary control module through the isolation unit.

According to some embodiments, the primary control module includes a pulse width modulation (PWM) unit. The PWM unit switches the isolation switch according to an output frequency. When the protection signal is received, the output frequency is selectively changed. When the output frequency is higher than a heavy load frequency, the PWM unit changes the output frequency so as to control an output voltage to be lower than a voltage output value. When the output frequency is not higher than the heavy load frequency, the PWM unit does not change the output frequency.

According to some embodiments, the PWM unit switches the isolation switch according to the output frequency. When the protection signal is received, and a primary current is higher than a heavy load current, the PWM unit changes the output frequency so as to control the output voltage to be lower than the voltage output value.

According to some embodiments, the PWM unit switches the isolation switch according to the output frequency. When the protection signal is received, and a primary voltage is higher than a heavy load voltage, the PWM unit changes the output frequency so as to control the output voltage to be lower than the voltage output value.

According to some embodiments, the low-power-consumption protection circuit includes a first current detection unit, a load detection module, a secondary feedback control module, and a blocking switch. The first current detection unit is coupled to a second current detection unit. The load detection module is coupled to the first current detection unit and the second current detection unit. The secondary feedback control module is coupled to the load detection module. The blocking switch is coupled to the secondary feedback control module. When the load detection module detects that the first current detection unit outputs a first voltage level and detects that the second current detection unit outputs a second voltage level, the secondary feedback control module selectively switches on or switches off the blocking switch according to the first voltage level and the second voltage level.

According to some embodiments, when the first voltage level is not equal to the second voltage level, the secondary feedback control module switches off the blocking switch so as to stop an output voltage. When the first voltage level is equal to the second voltage level, the secondary feedback control module switches on the blocking switch.

According to some embodiments, the first current detection unit and the second current detection unit are two resistors connected in series with each other and having substantially identical resistance values.

Therefore, according to some embodiments, determining, by the primary control module and the current detection unit, whether a conversion module is currently under the light load condition or the heavy load condition. When the conversion module is under the heavy load condition, a primary output frequency is regulated to reduce a voltage of a secondary output end. Therefore, the real-time circuit protection can be provided when the LPS test is carried out. According to some embodiments, determining, by a plurality of current detection units, whether the conversion module is under an abnormal state or is carried out the LPS test. When the abnormal state occurs or the LPS test is being carried out, an output path of the output end is open-circuited so as to provide the real-time circuit protection. In addition, the LPS specification, the element short/open circuit protection, and the LPS test protection are met at the same time by using a single protection circuit. Thus, the cost and volume space of elements can be reduced.

DETAILED DESCRIPTION

Figure 1:
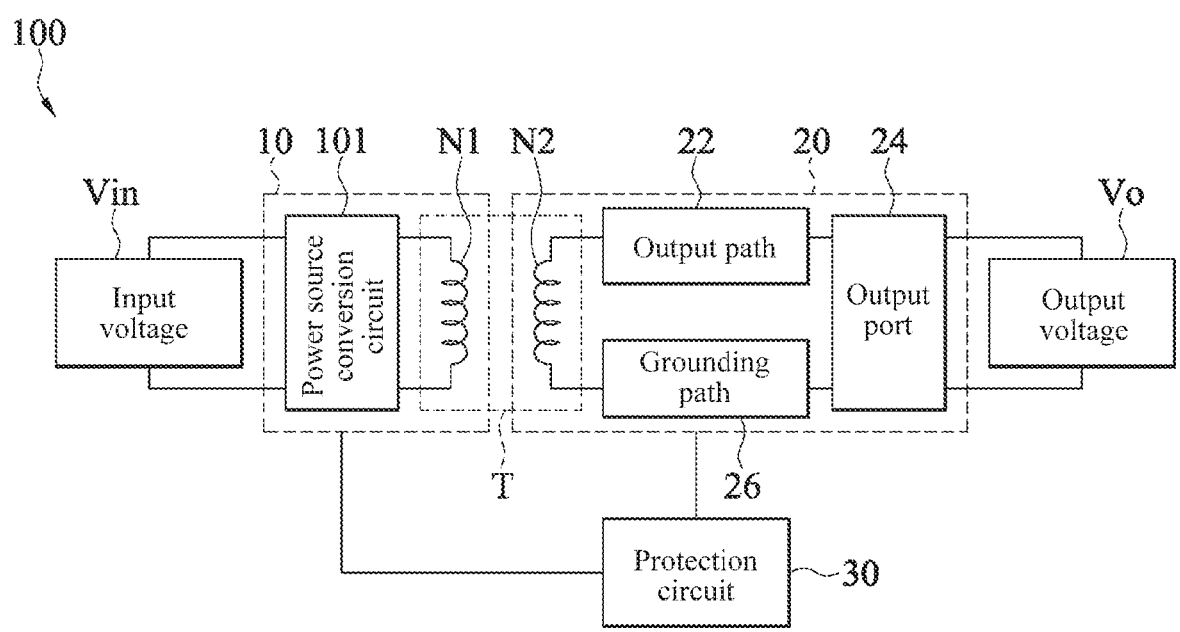
FIG. 1 is a schematic circuit block diagram of a conversion module according to one embodiment of the present invention.

Referring to FIG. 1, FIG. 1 illustrates a schematic circuit block diagram of a conversion module 100 according to one embodiment of the present invention. The conversion module 100 includes a primary circuit 10 and a secondary circuit 20. The primary circuit 10 includes a primary winding N1 and a power source conversion circuit 101. The power source conversion circuit 101 may be implemented by a circuit, such as a filter circuit or a power factor correction circuit, used for converting a power source. The circuit comprises active or passive electronic elements, such as a diode, an inductor, a capacitor, or a resistor. The primary winding N1 and a secondary winding N2 are windings at two sides of a transformer T. The transformer T may transmit energy from the primary winding N1 to the secondary winding N2 in an electromagnetic coupling manner. An input voltage Vin is converted into an output voltage Vo through the primary circuit 10 and the secondary circuit 20.

The secondary circuit 20 includes an output path 22, an output port 24, and a grounding path 26. The output path 22 is coupled to the secondary winding N2 and the output port 24. The output path 22 converts energy induced by the secondary winding N2 into the output voltage Vo. The output voltage Vo is outputted by the output port 24. The grounding path 26 is coupled to the secondary winding N2 and the output port 24. The grounding path 26 provides circuit grounding.

The conversion module 100 further includes a protection circuit 30. The protection circuit 30 is coupled to the primary circuit 10 and the secondary circuit 20 to solve the problem that a currently load condition cannot be obtained when a LPS test is carried out. For example, because there are parts of elements being subjected to a short circuit test, it is not possible to know directly whether the load is currently under a light load condition or a heavy load condition. For another example, because there are parts of elements being subjected to the short circuit test, it is not possible to directly obtain, by the secondary circuit 20, the information about the light load condition of the load or the heavy load condition of the load. When the protection circuit 30 detects that the grounding path 26 of the secondary circuit 20 outputs a voltage level, determining whether the primary circuit 10 is under a heavy load condition or not. For example, the primary circuit 10 is under a heavy load condition when the primary circuit 10 has a high current, a high voltage, or a high switching frequency. When the primary circuit 10 is under a heavy load condition, the voltage transmitted from the primary circuit 10 to the secondary circuit 20 is reduced. Therefore, the output voltage Vo is lower than a voltage output value, and the circuit can also be protected when the LPS test is carried out. The voltage output value is a value conforming to a criterion in the LPS specification. For example, a power obtained by the voltage output value and the current output value needs to be within 100 VA.

Figure 2:
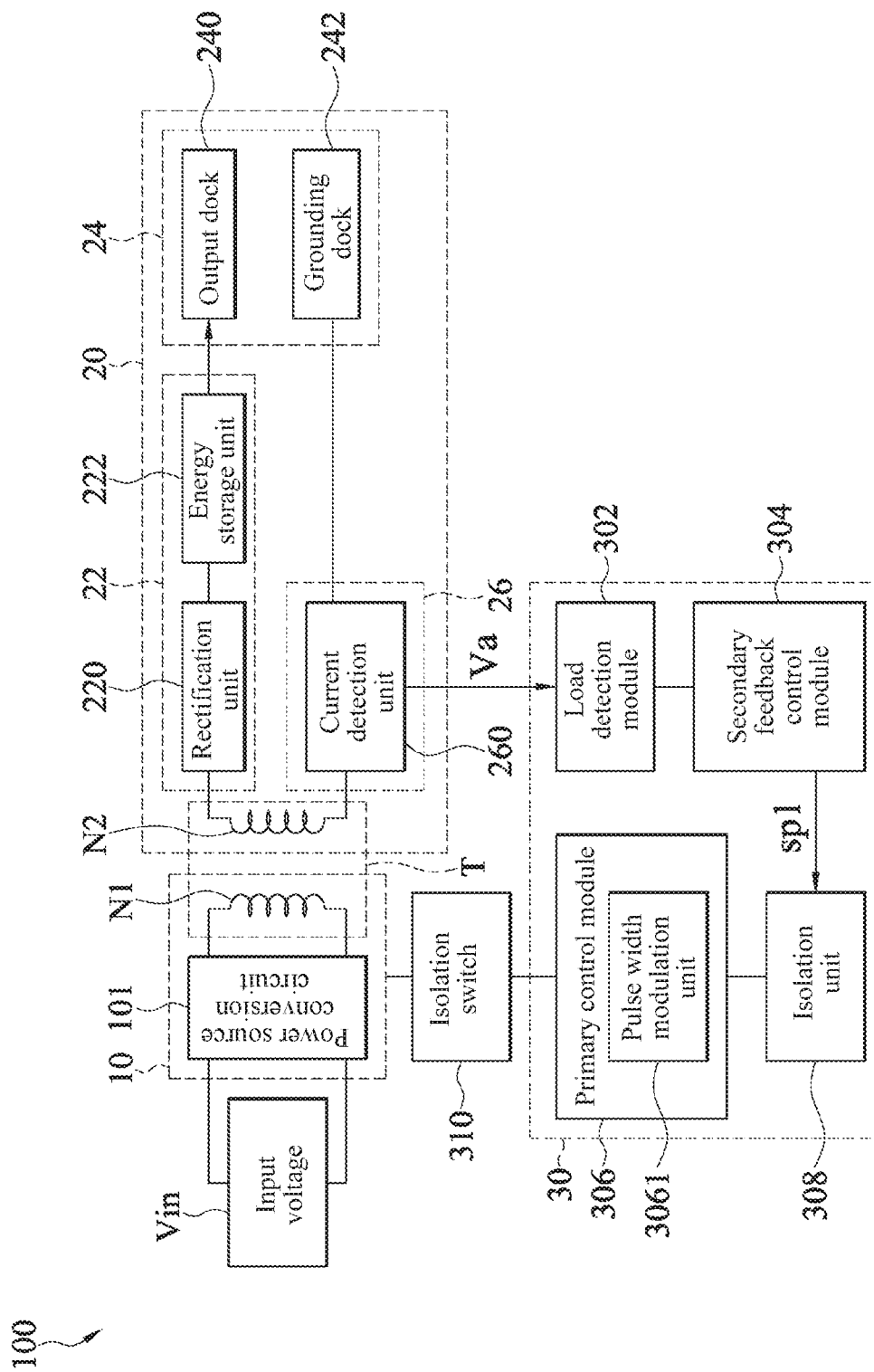
FIG. 2 is a schematic detailed circuit block diagram of a conversion module according to one embodiment of the present invention.

Referring to FIG. 2, FIG. 2 illustrates a schematic detailed circuit block diagram of a conversion module 100 according to one embodiment of the present invention. The output path 22 includes a rectification unit 220 and an energy storage unit 222. The rectification unit 220 is coupled to the secondary winding N2 and the energy storage unit 222. The rectification unit 220 rectifies energy induced by the secondary winding N2 into the output voltage Vo. Then, the rectification unit 220 stores the output voltage Vo through the energy storage unit 222. The energy storage unit 222 is coupled to the output port 24 so as to output the output voltage Vo.

The grounding path 26 includes a current detection unit 260. The current detection unit 260 is coupled to the secondary winding N2, the output port 24, and the protection circuit 30. The output port 24 includes an output dock 240 and a grounding dock 242. The output dock 240 is coupled to the energy storage unit 222 of the output path 22. The conversion module 100 transmits the output voltage Vo to an electronic device (not shown in the figure) through the output dock 240. The electronic device is connected to the output dock 240 and the grounding dock 242. The electronic device may be, for example, a mobile phone, a tablet computer, or a notebook computer and the like. The grounding dock 242 is coupled to the current detection unit 260. The grounding dock 242 provides a grounding function for the electronic device (not shown in the figure).

The protection circuit 30 includes a load detection module 302, a secondary feedback control module 304, and a primary control module 306. The load detection module 302 is coupled to the current detection unit 260. The secondary feedback control module 304 is coupled to the load detection module 302 and an isolation unit 308. The primary control module 306 is coupled to the isolation unit 308 and the isolation switch 310. The isolation switch 310 is coupled to the primary circuit 10 and the protection circuit 30. The load detection module 302 detects whether the current detection unit 260 outputs a voltage level Va or not. The load detection module 302 sends a control signal to the secondary feedback control module 304 when the voltage level Va is outputted. After receiving the control signal, the secondary feedback control module 304 sends a protection signal sp1, and the protection signal sp1 is transmitted to the primary control module 306 through the isolation unit 308. After the primary control module 306 receives the protection signal sp1, the primary control module 306 determines whether the primary circuit 10 is under a heavy load condition or not. When the primary circuit 10 is under a heavy load condition, the primary control module 306 switches the isolation switch 310 so as to reduce a voltage transmitted by the primary circuit 10 to the secondary circuit 20. Therefore, the output voltage Vo is enabled to be lower than the voltage output value so that the conversion module 100 is protected.

In some embodiments, the voltage level Va may be a light load voltage, such as a low voltage level. For example, the voltage level Va is a low voltage level when the current detection unit 260 is short-circuited. In some embodiments, the isolation unit 308 may be an optical coupler so as to avoid mutual interference between the primary circuit 10 and the secondary circuit 20, but the present invention is not limited thereto. In some embodiments, the isolation switch 310 may be a metal-oxide-semiconductor field-effect transistor (MOSFET) or a power switch and the like, but the present invention is not limited thereto. In some embodiments, the current detection unit 260 is one resistor or a plurality of resistors, but the present invention is not limited thereto. In some embodiments, the isolation switch 310 may be disposed on the protection circuit 30 or the primary circuit 10.

Herein, how to determine whether the primary circuit 10 is under the heavy load condition or not by the primary control module 306 is further illustrated. In some embodiments, the primary control module 306 includes a PWM unit 3061. The PWM unit 3061 switches, according to an output frequency, the isolation switch 310 to control a voltage of the primary circuit 10 at the primary winding N1 and to further control the output voltage Vo of the secondary circuit 20. For example, the PWM unit 3061 modulates a duty cycle of the isolation switch 310 to control the magnitude of the voltage of the primary winding N1. When an output load increases, a switching frequency of the isolation switch 310 (such as an output frequency of the PWM unit 3061, referred to as the output frequency hereafter) will be increased. Therefore, when the protection signal sp1 is received by the PWM unit 3061 and the output frequency is higher than the heavy load frequency, the PWM unit 3061 determines that the conversion module 100 is currently under the heavy load condition and needs to be protected. Therefore, the PWM unit 3061 changes the output frequency (for example, lowers the output frequency) so that the output voltage Vo is lower than the voltage output value. When the protection signal sp1 is received by the PWM unit 3061 and the output frequency is not higher than the heavy load frequency, it represents that the conversion module 100 is currently under a light load condition and has no danger. Therefore, the output frequency is not changed. In some embodiments, the heavy load frequency is about 25000 Hz, but the present invention is not limited thereto. In some embodiments, the PWM unit 3061 may be implemented by a PWM unit integrated circuit.

In some embodiments, when a current flowing through the output path 22 is lower than a threshold value, it represents that the output load is a light load. Under the light load condition, a current flowing through the primary circuit 10 may also be lower than a threshold value. Otherwise, the current is higher than a threshold value. For example, the load is under a heavy load condition when the current is higher than a threshold value. Therefore, when the protection signal sp1 is received by the PWM unit 3061 and the current flowing through the primary circuit 10 is higher than heavy load current (for example, higher than the threshold value), it is determined that the conversion module 100 is currently under the heavy load condition and needs to be protected. Then, the PWM unit 3061 is enabled to change the output frequency (for example, to lower the output frequency) so that the output voltage Vo is lower than the voltage output value. In some embodiments, the primary circuit 10 is provided with a primary current detection unit. After receiving the protection signal sp1, the PWM unit 3061 determines whether the voltage level generated by the primary current detection unit is a heavy load level or not. When the voltage level is the heavy load level, the PWM unit 3061 changes the output frequency so that the output voltage Vo is lower than the voltage output value. In some embodiments, the heavy load current may be a maximum current upper limit that the conversion module 100 can bear or the heavy load current may be an over current protection (OCP) point. In some embodiments, the heavy load level may be a maximum voltage upper limit that the conversion module 100 can bear.

In some embodiments, when a voltage output by the output path 22 is lower than a threshold value, it represents that the output load is a light load. Under the light load condition, the voltage of the primary circuit 10 may also be lower than the threshold value. Otherwise, the voltage of the primary circuit 10 may be higher than a threshold value. For example, the load is under the heavy load condition when the voltage of the primary circuit 10 is higher than a threshold value. Therefore, when the protection signal sp1 is received by the PWM unit 3061 and the voltage generated by the primary circuit 10 is higher than the heavy load voltage, it is determined that the conversion module 100 is currently under the heavy load condition and needs to be protected. The PWM unit 3061 is enabled to change the output frequency (for example, to lower the output frequency) so that the output voltage Vo is lower than the voltage output value. For example, the PWM unit 3061 detects a primary voltage feedback signal of the primary circuit 10 and then determines whether the conversion module 100 is in the light load or heavy load state according to the voltage level of the signal. Then, the PWM unit 3061 determines whether to change the output frequency or not according the load state of the conversion module 100. In some embodiments, the heavy load voltage may be 0.4 V, but the present invention is not limited thereto. In some embodiments, the heavy load voltage may be the maximum voltage upper limit that the conversion module 100 can bear.

When the LPS test is carried out, parts of elements (such as a current limiting element and a current limiting resistor) need to be short-circuited. In this case, a general circuit protection mechanism of the conversion module 100 may fail. Therefore, the load detection module 302 of the present invention detects whether the current detection unit 260 has the output voltage level Va or not. When the voltage level Va exists, determining whether the primary circuit 10 is under the heavy load condition or not. When the primary circuit is under the heavy load condition, controlling the output voltage Vo to conform to the LPS specification. Therefore, the conversion module 100 can be protected when the LPS test is carried out.

Figure 3:
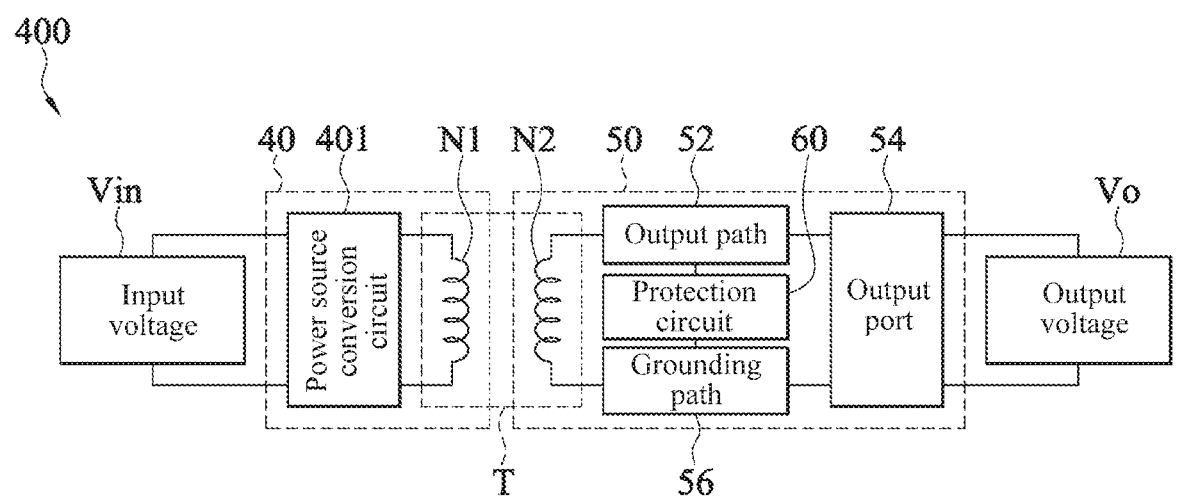
FIG. 3 is a schematic circuit block diagram of a conversion module according to another embodiment of the present invention.

Referring to FIG. 3, FIG. 3 illustrates a schematic circuit block diagram of a conversion module 400 according to another embodiment of the present invention. Compared with the embodiment shown in FIG. 1, a protection circuit 60 of the conversion module 400 is coupled to an output path 52 and a grounding path 56 of a secondary circuit 50 so as to solve the problem that a current load condition cannot be obtained when the LPS test is carried out. For example, because there are parts of elements being subjected to a short circuit test, it is not possible to know directly whether the load is currently under a light load condition or a heavy load condition. For another example, because there are parts of elements being subjected to the short circuit test, it is not possible to directly obtain, by the secondary circuit 20, the information about the light load condition of the load or the heavy load condition of the load. When a plurality of voltage levels outputted by the grounding path 56 of the secondary circuit 50 are detected by the protection circuit 60 and the voltage levels are different from each other, the protection circuit 60 controls the output path 52 to be open-circuited so that the conversion module 400 does not output an output voltage Vo. Therefore, the conversion module 400 can still be protected when the LPS test is carried out. Herein, a power source conversion circuit 401 is similar to the power source conversion circuit 101 shown in FIG. 1, the primary circuit 40 is similar to the primary circuit 10 shown in FIG. 1, and an output port 54 is similar to the output port 24 shown in FIG. 1.

In some embodiments, the secondary circuit 50 includes the protection circuit 60, the output path 52, the output port 54, and the grounding path 56. The output path 52 is coupled to the secondary winding N2, the protection circuit 60, and the output port 54. The output path 52 converts the energy induced by the secondary winding N2 into the output voltage Vo. The output voltage Vo is outputted by the output port 54. The grounding path 56 is coupled to the protection circuit 60, the secondary winding N2, and the output port 24. The grounding path 56 provides circuit grounding.

Figure 4:
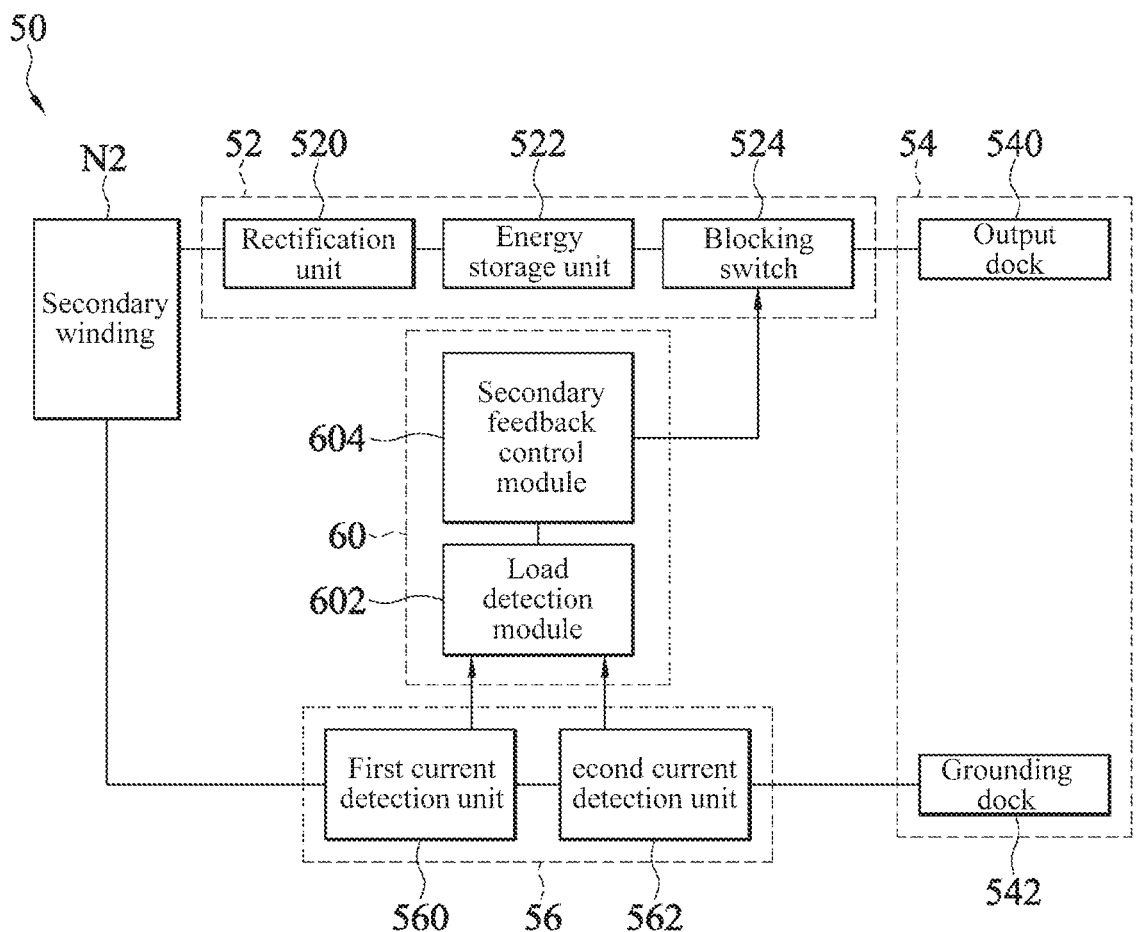
FIG. 4 is a schematic circuit block diagram of a secondary circuit according to another embodiment of the present invention.

Referring to FIG. 4, FIG. 4 illustrates a schematic circuit block diagram of a secondary circuit 50 according to another embodiment of the present invention. Compared with the embodiment in FIG. 2, the output path 52 includes a rectification unit 520, an energy storage unit 522, and a blocking switch 524. The blocking switch 524 is coupled to the energy storage unit 522, the protection circuit 60, and the output port 54. The energy storage unit 522 is coupled to the rectification unit 520 and the blocking switch 524. The rectification unit 520 is coupled to the secondary winding N2 and the energy storage unit 522. When the protection circuit 60 detects that the conversion module 400 has an abnormal condition, the protection circuit 60 outputs a control signal to switch off the blocking switch 524 and to make the conversion module 400 stop outputting the output voltage Vo. The output path 52 is open-circuited when the blocking switch 524 is switched off. For an example, a plurality of voltage levels outputted by the grounding path 26 are different from each other when the conversion module 400 has an abnormal condition. For another example, elements are short-circuited when the conversion module 400 has an abnormal condition. In addition, in the present embodiment, the blocking switch 524 is switched off only for controlling open-circuiting of the output path 52. Thus, any manner can be used if it can control the output path 52 to be in an open circuit state. In other words, in the present embodiment, for example but not limited to, when the blocking switch 524 is switched on, the output path 52 is open-circuited so that the conversion module 400 does not output the output voltage Vo.

Figure 5:
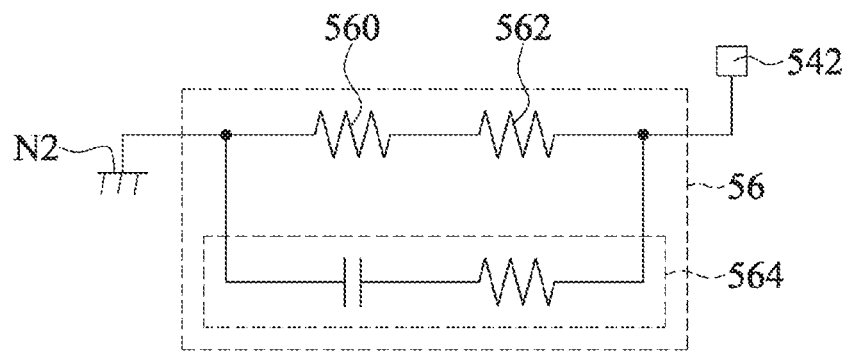
FIG. 5 is a schematic detailed circuit diagram of a grounding path according to one embodiment of the present invention.

Referring to FIG. 4 and FIG. 5, FIG. 5 illustrates a schematic detailed circuit diagram of the grounding path 56 according to one embodiment of the present invention. The grounding path 56 includes a first current detection unit 560 and a second current detection unit 562. The first current detection unit 560 is coupled to the secondary winding N2, the second current detection unit 562, and the protection circuit 60. The second current detection unit 562 is coupled to the first current detection unit 560, the output port 54, and the protection circuit 60. The output port 54 includes an output dock 540 and a grounding dock 542. The output dock 540 is coupled to the blocking switch 524. The conversion module 400 transmits the output voltage Vo to an electronic device (not shown in figure) through the output dock 540. The electronic device is connected to the output dock 540 and the grounding dock 542. The grounding dock 542 is coupled to the grounding path 56. The grounding dock 542 provides a grounding function for the electronic device (not shown in figure). In some embodiments, the first current detection unit 560 and the second current detection unit 562 are respectively a resistor. In some embodiments, the first current detection unit 560 and the second current detection unit 562 have the substantially identical resistance value. In some embodiments, the first current detection unit 560 and the second current detection unit 562 are mutually connected in series. In some embodiments, the grounding dock 542 is coupled to the second current detection unit 562.

As shown in FIG. 5, in some embodiments, the grounding path 56 may also include a filter circuit 564. Two ends of the filter circuit 564 are respectively coupled to the first current detection unit 560 and the second current detection unit 562. The filter circuit 564 helps to filter the current flowing through the first current detection unit 560 and the second current detection unit 562. The filter circuit 564 may also be an RC filter circuit defined by a resistor and a capacitor. Herein, the secondary winding N2 shown in FIG. 5 is one end of the secondary winding N2, for example, the grounding end of the secondary winding N2.

Referring to FIG. 4 again, the protection circuit 60 includes a load detection module 602 and a secondary feedback control module 604. The load detection module 602 is coupled to the first current detection unit 560 and the second current detection unit 562. The secondary feedback control module 604 is coupled to the load detection module 602 and the blocking switch 524. The load detection module 602 detects whether the first current detection unit 560 outputs the first voltage level or not. The load detection module 602 also detects whether the second current detection unit 562 outputs a second voltage level or not. When the first voltage level and the second voltage level are detected by the load detection module 602, the load detection module 602 transmits voltage levels to the secondary feedback control module 604. The secondary feedback control module 604 determines whether the conversion module 400 is in an abnormal state or not according to the received first voltage level and second voltage level. For example, the secondary feedback control module 604 compares whether the first voltage level and the second voltage level are the same or not. When the first voltage level and the second voltage level are the same, the conversion module 400 is in a normal state. The secondary feedback control module 604 sends a control signal to switch on the blocking switch 524. Therefore, the output path 52 can be keep on, and the energy storage unit 522 can output the output voltage Vo to the output port 540. When the first voltage level and the second voltage level are different, the conversion module 400 is in an abnormal state. For an example, the first current detection unit 560 or the second current detection unit 562 is short-circuited when the conversion module 400 is in the abnormal state. For another example, the first current detection unit 560 and the second current detection unit 562 has no identical current flow through when the conversion module 400 is in the abnormal state. The secondary feedback control module 604 sends the control signal to switch off the blocking switch 524 when the first voltage level and the second voltage level are different. The conversion module 400 stop outputting the output voltage Vo when the blocking switch 524 is switched off. In some embodiments, a normal state mode of the blocking switch 524 is an on state, i.e., the output path 52 is switched on so that the energy storage unit 522 can output the output voltage Vo to the output port 540.

In some embodiments, the blocking switch 524 may be disposed on the protection circuit 60. In some embodiments, the first current detection unit 560 or the second current detection unit 562 may be disposed on the protection circuit 60. In some embodiments, the first current detection unit 560 and the second current detection unit 562 may be disposed on the protection circuit 60.

In some embodiments, the output port 24 shown in FIG. 2 or the output port 54 shown in FIG. 4 may also include a transmission dock (not shown in figure). The transmission dock is coupled to the protection circuit 30 or the protection circuit 60. The conversion module 100 or the conversion module 400 communicates with the electronic device (not shown) through the transmission dock. Further, the electronic device may require, through a transmission signal transmitted between the transmission dock and the protection circuit 30 or between the transmission dock and the protection circuit 60, the conversion module 100 or the conversion module 400 to provide an output voltage Vo, wherein the level of the output voltage Vo meets the operation of the electronic device. When the protection circuit 30 or the protection circuit 60 obtains the voltage level need of the electronic device through the transmission dock, the protection circuit 30 or the protection circuit 60 outputs a modulation signal to a modulation coupling unit (not shown in figure). Therefore, the level of the output voltage Vo can meet the voltage level need of the electronic device. The modulation coupling unit may be disposed on the secondary circuit 20, the secondary circuit 50, the primary circuit 10, or the primary circuit 40. In some embodiments, as shown in FIG. 2, when the protection circuit 30 obtains the voltage level need of the electronic device through the transmission dock, the protection circuit 30 outputs a modulation signal to the primary control module 306 to switch the switching frequency of the isolation switch 310 (or to switch the duty cycle of the isolation switch 310, or to change the output frequency/the duty cycle of the PWM unit 3061). Then, the output voltage Vo is regulated and meets the voltage level need of the electronic device.

In some embodiments, the load detection module 302, 602, and the secondary feedback control module 304, 604 may be defined by a physical circuit. In some embodiments, the load detection module 302, 602, and the secondary feedback control module 304, 604 may be integrated into a control integrated circuit so as to be used as the protection circuit 30, 60 of the present invention. In addition, in the present invention, the embodiments in FIG. 1 to FIG. 5 may be mutually applied. For example, but not limited to, the blocking switch 524 in FIG. 4 may also be disposed on the output path 22 in FIG. 2. For connection relationships derived from mutual application, refer to FIG. 1 to FIG. 5, and the descriptions thereof are omitted herein.

Therefore, according to some embodiments, determining, by the primary control module and the current detection unit, whether a conversion module is currently under the light load condition or the heavy load condition. When the conversion module is under the heavy load condition, a primary output frequency is regulated to reduce a voltage of a secondary output end. Therefore, the real-time circuit protection can be provided when the LPS test is carried out. According to some embodiments, determining, by a plurality of current detection units, whether the conversion module is under an abnormal state or is carried out the LPS test. When the abnormal state occurs or the LPS test is being carried out, an output path of the output end is open-circuited so as to provide the real-time circuit protection. In addition, the LPS specification, the element short/open circuit protection, and the LPS test protection are met at the same time by using a single protection circuit. Thus, the cost and volume space of elements can be reduced.

What is claimed is:

1. A low-power-consumption protection circuit, comprising:
    a first current detection unit, coupled to a second current detection unit;
    a load detection module, coupled to the first current detection unit and the second current detection unit;
    a secondary feedback control module, coupled to the load detection module; and
    a blocking switch, coupled to the secondary feedback control module;
    wherein when the load detection module detects that the first current detection unit outputs a first voltage level and detects that the second current detection unit outputs a second voltage level, the secondary feedback control module selectively switches on or switches off the blocking switch according to the first voltage level and the second voltage level;
    wherein when the first voltage level is not equal to the second voltage level, the secondary feedback control module switches off the blocking switch so as to stop an output voltage.

2. The low-power-consumption protection circuit according to claim 1, wherein when the first voltage level is equal to the second voltage level, the secondary feedback control module switches on the blocking switch.

3. The low-power-consumption protection circuit according to claim 1, wherein the first current detection unit and the second current detection unit are two resistors connected in series with each other and having substantially identical resistance values.

* * * * *